United States Patent [19]

Harris et al.

[11] Patent Number: 5,985,969
[45] Date of Patent: Nov. 16, 1999

[54] POLYAMIC ACID PRECURSORS AND METHODS FOR PREPARING HIGHER MOLECULAR WEIGHT POLYAMIC ACIDS AND POLYIMIDEBENZOXAZOLE

[75] Inventors: William J. Harris; Wen-Fang Hwang, both of Midland, Mich.

[73] Assignee: The Dow Chemical Company, Midland, Mich.

[21] Appl. No.: 09/027,701

[22] Filed: Feb. 23, 1998

Related U.S. Application Data

[63] Continuation of application No. 08/428,815, Apr. 24, 1995, Pat. No. 5,741,585.

[51] Int. Cl.⁶ .............................. B29D 22/00; C08G 63/08

[52] U.S. Cl. .......................... 524/233; 524/717; 524/726; 528/312; 528/314; 528/316; 528/317; 528/318; 528/321; 528/351; 528/352; 528/353; 528/481; 528/492; 528/493; 528/503; 428/357; 428/473.5

[58] Field of Search ...................... 528/312, 314, 528/316, 317, 318, 321, 351, 352, 353, 481, 492, 493, 503; 524/233, 717, 726; 428/357, 473.5

[56] References Cited

U.S. PATENT DOCUMENTS 5,741,585 4/1998 Harris et al. ............................. 428/357

*Primary Examiner*—Nathan M. Nutter

[57] ABSTRACT

Polyimide precursor solutions comprise an organic liquid and the reaction product of an aromatic dianhydride and an aromatic diaminobenzoxazole capped, on at least one terminal end, with a bifunctional chain extender. The bifunctional chain extender has one functional group reactive with the amine of the aromatic diaminobenzoxazole or the anhydride of the aromatic dianhydride and another functional group which does not form amic acid linkages, but which is capable of further reaction to increase the molecular weight of the polyimide precursor under conditions other than those used to react the aromatic diamine and aromatic dianhydride to form the polyimide precursor. These polyimide precursors can be converted into polyimidebenzoxazole polymers.

16 Claims, No Drawings

POLYAMIC ACID PRECURSORS AND METHODS FOR PREPARING HIGHER MOLECULAR WEIGHT POLYAMIC ACIDS AND POLYIMIDEBENZOXAZOLE

This application is a continuation of prior application Ser. No. 08/428,815 filed Apr. 24, 1995 which is now U.S. Pat. No. 5,741,585.

BACKGROUND OF THE INVENTION

The present invention relates to polyimide precursors, to a method for converting these precursors into higher molecular weight polyamic acids and/or polyimidebenzoxazole ("PIBO") polymers, and to films and coatings of PIBO.

In the preparation of polyimidebenzoxazole, a dianhydride and diaminobenzoxazole are first reacted to form a polyamic acid. The polyamic acid is then converted to PIBO by closing the amic acid linkages to form imide rings. In general, the polyamic acids are prepared as a solution in an organic solvent such as N,N'-dimethylacetamide or the like. Heretofore, only a limited number of dianhydride/diaminobenzoxazole combinations have been disclosed as being useful for producing PIBO.

U.S. Pat. No. 4,087,409 to Preston broadly teaches reacting two symmetrical monomers to produce an essentially linear heterocyclic polymer having at least two different heterocyclic linkages. Polyamic acids can be prepared by selecting monomers from an otherwise long list of monomers (e.g. 2,2'-p-phenylene bis(5-aminobenzoxazole) and pyromellitic dianhydride). See also, the articles "Fibers from Ordered Benzheterocycle-Imide Copolymers," *Appl. Poly. Sym.*, No. 9, pp. 145–158 (1969) and "New High-Temperature Polymers, VIII. Ordered Benzoxazole- and Benzothiazole-Imide Copolymers," *J. Poly. Sci.*, Part A-1 (1969), 7(1), pp. 283–296.

"Azole Analogs of Polypyromellitimides,"*Vysokomol. soed.*, Vol. (A) XIII, No. 11, 1971, pp. 2565–2570, discloses synthesis of azole containing analogs of poly-[N,N'-(p,p'-phenoxyphenylene)pyro-mellitimide]. A PIBO prepared from 2,6-di(p, p'-aminophenoxyphenyl)benzo[1,2-d:5,4-d'] bisoxazole and pyromellitic dianhydride is described.

U.S. Pat. No. 4,866,873 to Mukai et al., discloses an aromatic heterocyclic polyimide comprising substantially equimolar amounts of a specific aromatic, trans-benzobisoxazole or trans-benzobisthiazole diamine such as 2,6-(4,4'-diaminodiphenyl)benzo[1,2-d:4,5-d']bisoxazole and a specific aromatic tetracarboxylic dianhydride such as pyromellitic dianhydride. These polyamic acid precursors are prepared in an amide solvent and converted to PIBO. Similar PIBO polymers prepared from a polyamic acid solution are taught in Japanese Pat. Appl. No. 2-41819 to Mitsubishi Kasei Corporation and in "Novel Aromatic Heterocyclic Polyimide (PIBT) Having Ultra-High Modulus of Elasticity" by Seiichi Nozawa, *Kagaku to Kogyo*, 44(7), 1154 (1991).

"Synthesis and Mechanical Properties of Novel Polyimide Containing Heterocycles" by Nozawa, Taytama, Kimura and Mukai presented at the 22nd International SAMPE Technical Conference (held Nov. 6–8, 1990), teaches synthesis of one type of trans-PIBT or trans-PIBO using a polyamic acid precursor of 4,4'-diaminophenylenebenzobisthiazole and pyromellitic dianhydride. Japanese Patent Application No. 41-42458 (Patent KOHO No. 45-8435) to Taoka Senryo Seizo K. K. teaches the synthesis of PIBO from a polyamic acid with the polyamic acid being prepared from an aromatic diamine containing a single benzoxazole ring such as 5-amino-2-(4-aminophenyl) benzoxazole and an aromatic tetracarboxylic acid dianhydride using thermal ring-closure techniques.

While some of the described PIBO polymers have been formed into fibers and films, they do not generally have sufficient physical and/or chemical properties (such as tensile modulus, tensile strength, elongation-to-break and coefficient of thermal expansion (CTE)) to make them generally useful in applications such as for the electronics industry.

In addition, polyamic acids used in preparing PIBO polymers can form highly viscous solutions at relatively low solids content. For example, solutions of polyamic acid containing as little as 7 weight percent of a high molecular weight polyamic acid can exhibit a viscosity of 100,000 centipoise (cps) or more. For various applications such as casting of films using conventional techniques, these high viscosities can be acceptable; for other applications such as spin-casting of coatings, lower viscosities are required or desired.

European Patent Publication No. 0 355 927 to Asahi discloses a photopolymerizable polyimide precursor comprising a specific polyamic acid ester, polyamic amide or polyamic acid salt structure derived from a tetracarboxylic acid compound, a specific diamine compound and an alcohol such as 2-hydroxyethyl acrylate or an epoxy compound such as glycidyl methacrylate. Each of the polymer repeat units of the described polymer contains a pendant organic group having 1 to 20 carbon atoms. The reference also suggests that when a group such as —C≡N or —C≡CH or a maleic anhydride residue is introduced into the precursor as a terminal group, the molecular weight of the ultimate polyimide produced by heat-curing can be increased. The polymers form a composition photopolymerizable with a photopolymerization initiator. The resulting PIBO polymer can be used to coat substrates for subsequent use in photolithography. Films produced from these cross-linked polymers exhibit relatively low tensile strengths and tensile modulus.

In view of the deficiencies in the prior art, it remains desirable to prepare polyimide precursor solutions from which PIBO polymers having a desired combination of chemical and physical properties can be prepared, including, when desired, a polyimide precursor solution having a higher solids content at acceptable viscosities for film forming applications, e.g., spin-casting. In addition, it remains desirable to convert these PIBO polymers into useful films and coatings.

SUMMARY OF THE INVENTION

Accordingly, in one aspect, the present invention is a polyimide precursor comprising a reaction product of an aromatic dianhydride and an aromatic diaminobenzoxazole which reaction product is terminated, on at least one but not more than two chain end(s), with a bifunctional chain extender having one functional group reactive with the amine of the aromatic diaminobenzoxazole or the anhydride of the aromatic dianhydride and having another functional group which does not form amic acid linkages and, which is capable of further reaction to increase the molecular weight of the reaction product or the PIBO prepared therefrom under conditions other than those used to react the aromatic diamine and aromatic dianhydride to form the polyimide precursor.

In a preferred embodiment, the aromatic dianhydride is of the formula:

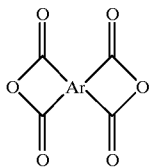

and the aromatic diaminobenzoxazole is of the formula:

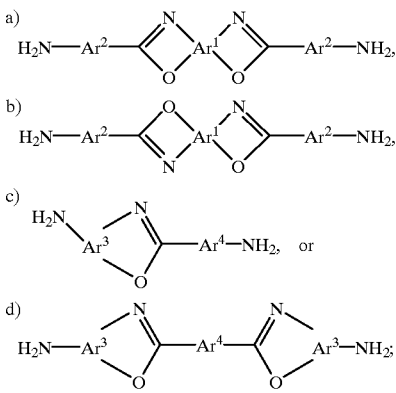

where Ar, $Ar^1$, $Ar^2$, $Ar^3$, and $Ar^4$ are an aromatic group or pyridine group and the bifunctional chain extender is $H_2N$—$M$—$C(R)$=$C(R)_2$, $H_2N$—$M$—$C \equiv C(R)$,

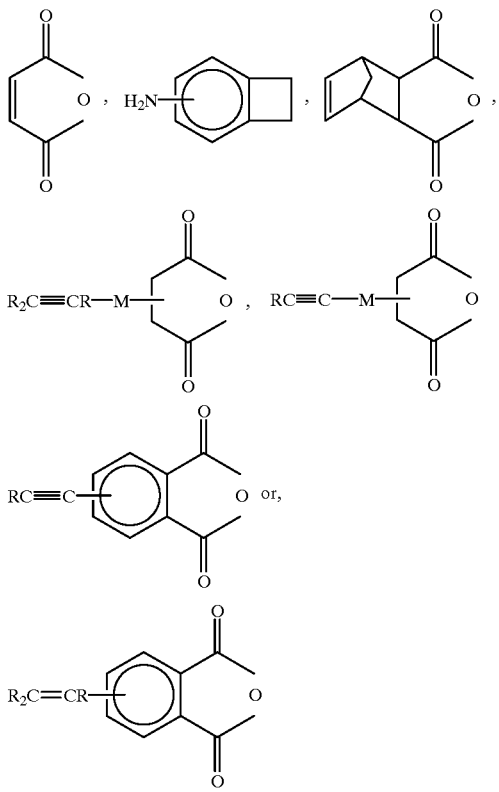

where M is a divalent organic radical, preferably alkylene or arylene; and R is hydrogen, alkyl or aryl. The polyimide precursor is typically prepared as a solution in an organic liquid.

A PIBO polymer can be prepared from the polyimide precursor by exposing the precursor at conditions sufficient, either simultaneously or sequentially, to cyclocondense (imidize) the precursor and increase its molecular weight and in another aspect, the present invention is a method for preparing a PIBO polymer by heating the polyimide precursor. While imidization and an increase in molecular weight or chain extension may occur at substantially the same or widely different temperatures, in general, the polyimide precursor is subjected to a conversion temperature(s) from about 160° C. to about 280° C. to convert at least a portion of the precursor to polyimidebenzoxazole or a higher molecular weight polyamic acid (PA).

In a preferred embodiment, the PA/PIBO is further treated by exposing it to an additional temperature higher than the conversion temperature and from about 250° C. to about 600° C. for from about 0.1 to about 300 minutes. This further heat-treatment can comprise exposing the PA/PIBO to a single, or two or more different, successively higher temperatures. In a most preferred embodiment, following exposure to the conversion temperature, the PA/PIBO is exposed to (i) a single temperature of greater than about 350° C. and less than about 600° C. for about 0.1 to about 120 minutes or, alternatively, to (ii) an annealing temperature from about 250° C. to about 400° C. for from about 0.1 to about 120 minutes and then a heat-treating temperature, higher than the annealing temperature, from about 260° C. to about 600° C. for from about 0.1 to about 120 minutes.

In yet another aspect, the present invention is a method for preparing a polyimidebenzoxazole film which comprises the steps of:

a) forming a liquid film of a polyimide precursor solution;
b) removing at least a portion of the organic liquid employed as the reaction medium from the polyimide precursor solution; and
c) heating the polyimide precursor at a conversion temperature from about 160° C. to about 280° C. for a period of from about 5 to about 90 minutes.

Optionally, the method comprises an additional step (d) in which the polyimide precursor is further exposed to a temperature higher than the conversion temperature and from about 250° C. to about 600° C. for from about 0.1 to about 300 minutes. In a preferred embodiment, the liquid film is contacted with a ring-closure agent prior to or while at a temperature at which imidization can occur.

In still another aspect, the present invention is a polyimidebenzoxazole film made using the described process.

The polyimide precursors can be prepared in a controlled manner by the reaction of the aromatic dianhydride, the aromatic diaminobenzoxazole, and the bi-functional chain terminator without an alcohol or epoxy reactant and in the absence or essentially absence of same. The molecular weight of the reaction product and its solution viscosity can be controlled by the time and temperature of the reaction as well as the stoichiometry of the reactants. The resulting polyimide precursor product is soluble in many common organic solvents such as N-methylpyrrolidinone and N,N'-dimethylacetamide.

A PIBO polymer is prepared by heating the polyimide precursor. As such, the polyimide precursor can be directly converted from a soluble, processable material to the finished, PIBO polymer. Hence, the method of the present invention facilitates the preparation of finished PIBO polymer articles. For example, in the preparation of coatings, the soluble precursor can be applied to a substrate or article being coated and subsequently and directly converted into the desired PIBO product.

The PIBO polymers prepared from the precursors exhibit an excellent balance of chemical and physical properties, including a good combination of strength, modulus and elongation-to-break and good resistance to environmental influences. By selecting the type and amount of monomers and specific conditions of preparation, it is possible to modify and design these properties. The PIBO products can be prepared as rigid and stiff or more flexible materials, depending on the specific monomers selected and desired end use. The synthesis techniques for making polyimide precursors and processing techniques for converting the polyamic acid into PIBO results in polymers having good molecular weights and films and coatings with excellent properties, including excellent tensile properties; electrical properties such as dielectric constant, dissipation factor, break down voltage and arc tracking, and dimensional stability properties.

DETAILED DESCRIPTION OF THE INVENTION

In the present invention, polyimide precursors are prepared by reacting an aromatic dianhydride, an aromatic diaminobenzoxazole and a bifunctional chain terminator. The aromatic dianhydride and an aromatic diaminobenzoxazole suitably employed in the practice of the present invention are those dianhydrides and diamines which are capable of reacting to form a polyamic acid.

Representative aromatic dianhydride include compounds of the following structural formula:

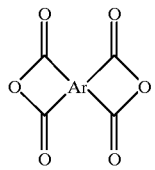

in which Ar can be an aromatic, including polyaromatic and fused aromatic, or inertly substituted aromatic, wherein "inertly substituted aromatic" means an aromatic having one or more substituent groups such as a halogen which is essentially inert, preferably inert, to reaction with the aromatic diaminobenzoxazole. For example, Ar can be:

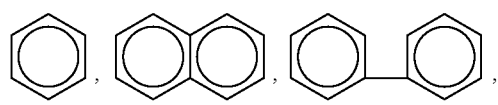

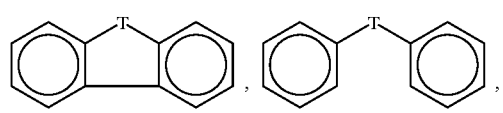

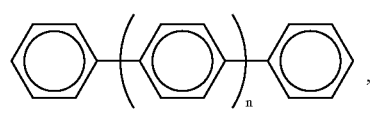

-continued

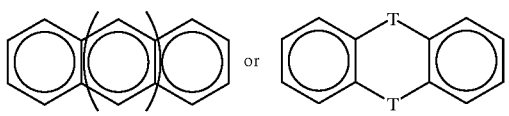

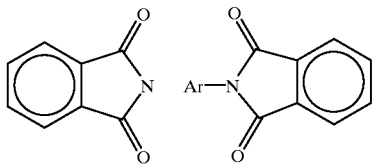

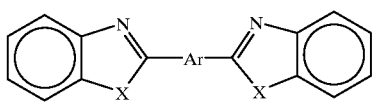

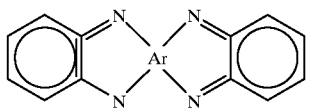

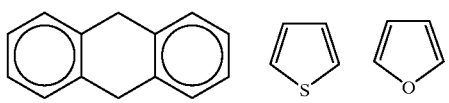

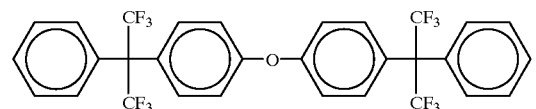

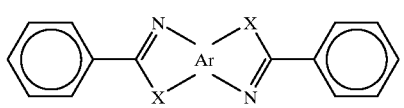

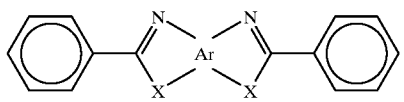

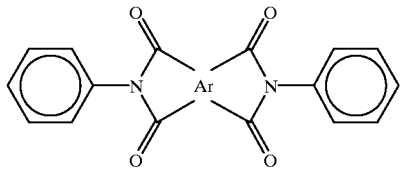

where T is —O—, alkylene, —S—, —CF$_2$—, —SO$_2$—, —CH$_2$—,

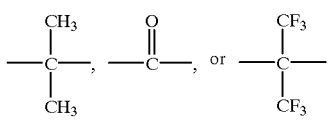

The most preferred dianhydrides are pyromellitic dianhydride ("PMDA"):

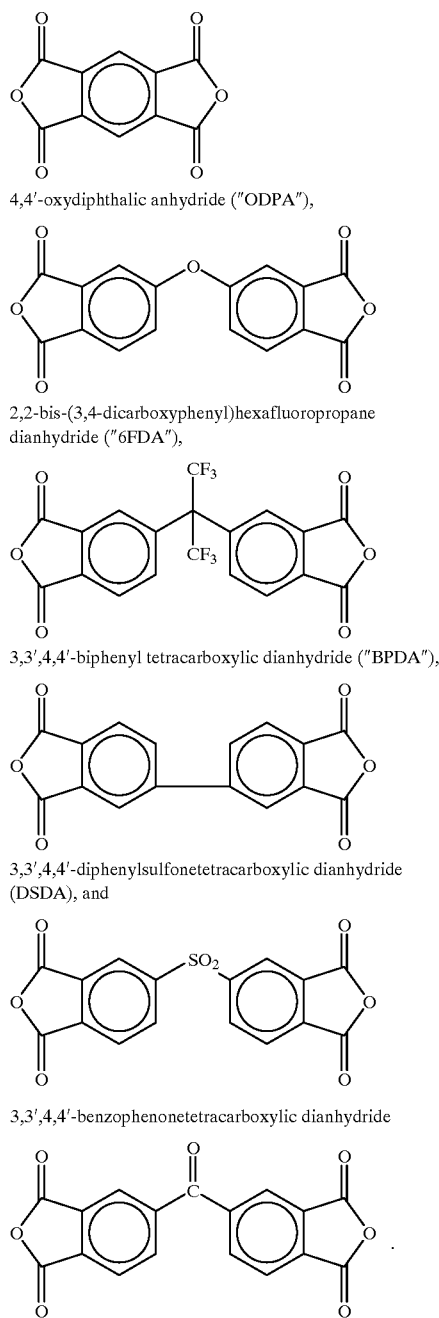

4,4'-oxydiphthalic anhydride ("ODPA"), 2,2-bis-(3,4-dicarboxyphenyl)hexafluoropropane dianhydride ("6FDA"), 3,3',4,4'-biphenyl tetracarboxylic dianhydride ("BPDA"), 3,3',4,4'-diphenylsulfonetetracarboxylic dianhydride (DSDA), and 3,3',4,4'-benzophenonetetracarboxylic dianhydride Representative diaminobenzoxazoles useful in the practice of the present invention include compounds of the following structural formula:

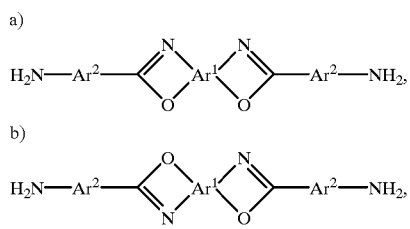

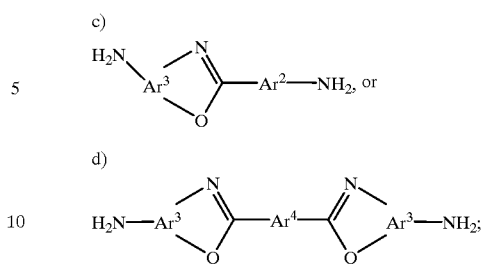

where $Ar^1$, $Ar^2$, $Ar^3$, and $Ar^4$ are an aromatic group, inertly substituted aromatic group, or pyridine group.

Preferred diaminobenzoxazole monomers include:

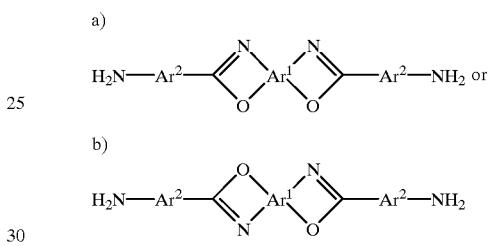

when $Ar^1$ is:

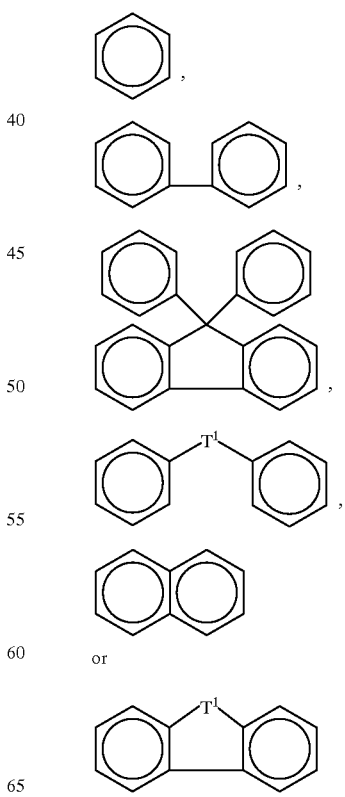

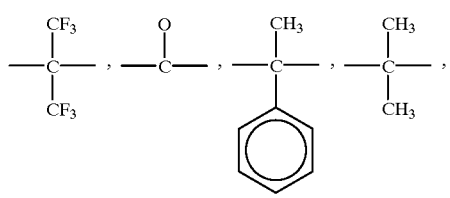
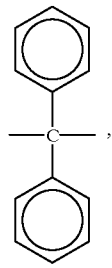,
,
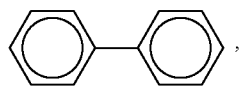,
or
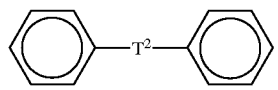
and T² is —O—, —SO₂—, —S—, —S(=O)—, —CH₂—, —Si(R)₂—,
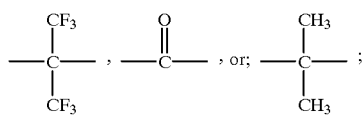
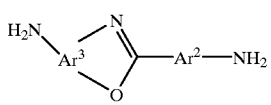
,
-continued
,
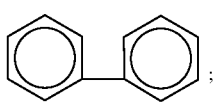;
, or
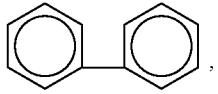
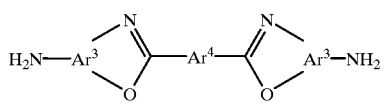
,
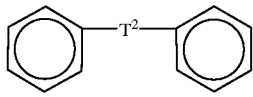,
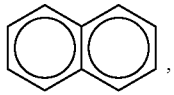,
,
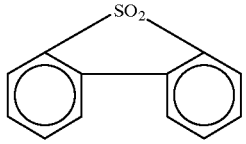
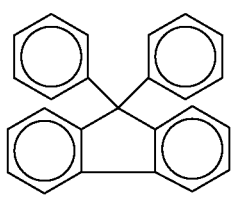
or
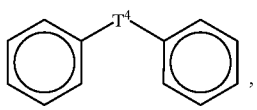,
and T⁴ is: —S—, —O—, SO₂—, —CH₂—, —HC=CH—

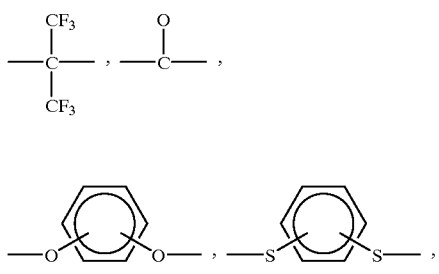

or

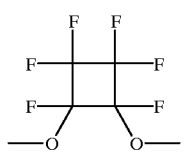

The most preferred diaminobenzoxazole monomers are 2,6-(4,4'-diaminodiphenyl)benzo[1,2-d:5,4-d']bisoxazole ("DABO"):

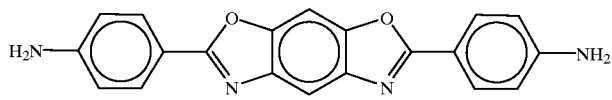

5-amino-2-(p-aminophenyl)benzoxazole ("p-DAMBO"),

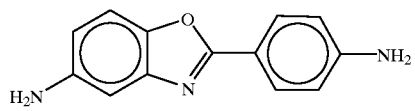

5-amino-2-(m-aminophenyl)benzoxazole ("m-DAMBO"),

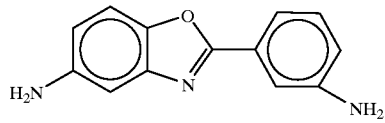

4,4'-diphenylether-2,2'-bis(5-aminobenzoxazole) ("OBA(DAMBO)$_2$"),

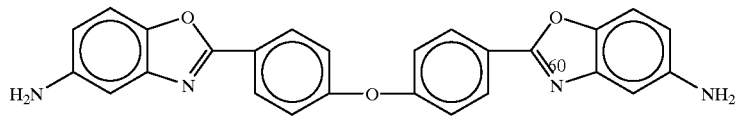

2,2'-p-phenylenebis(5-aminobenzoxazole) ("TA(DAMBO)$_2$"),

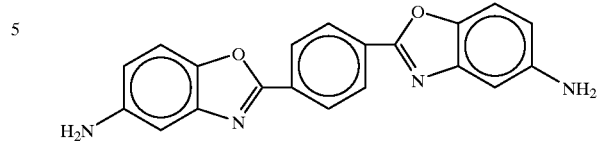

and 2,2-bis(4-phenyl)hexafluoropropane-2,2'-bis(5-aminobenzoxazole) ("6FA(DAMBO)$_2$")

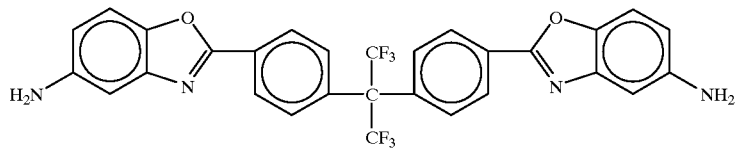

The bifunctional chain extender is a compound with one functional group reactive with either the amine of the aromatic diaminobenzoxazole or the anhydride of the aromatic dianhydride and a second functional group (hereinafter referred to as a "latent moiety") which does not form amic acid linkages with either the amine or the anhydride and which is capable of further reaction to increase the molecular weight of either the polyamic acid or the PIBO formed therefrom under conditions other than those used to react the aromatic diamine and aromatic dianhydride to form the polyimide precursor.

Examples of such bifunctional chain extenders include compounds having one reactive group which is either a primary or secondary amine moiety (i.e., —NH$_2$ or —NRH), or a cyclicdicarboxylic anhydride moiety and one latent moiety which is capable of reacting to extend chain length or cross-link the polyamic acid or PIBO such as an unsaturated group (i.e., >C=C< or —C≡C—) or a strained aromatic ring such as a cyclobutene, which, upon the application of heat will open to further react. Epoxy and isocyanate groups are not suitable as latent moieties since they generally will react with the amine of the aromatic diaminobenzoxazole at the conditions normally used in preparing the polyimide precursor.

Preferred examples of bifunctional chain extenders are represented by the structural formulas:

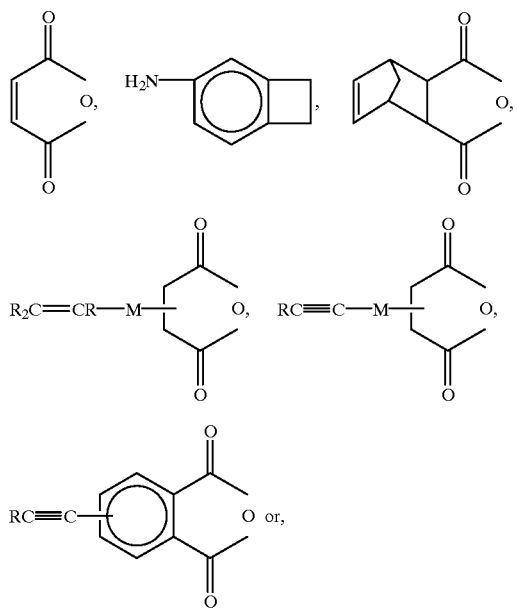

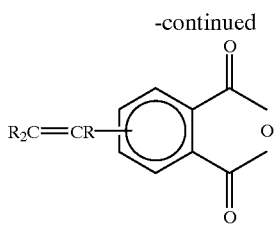

wherein M is a divalent organic radical, preferably alkylene or arylene, more preferably an alkylene having from 1 to about 12 carbon atoms or phenylene, and most preferably methylene or phenylene; and R is hydrogen, alkyl or aryl, preferably hydrogen, methyl, or phenyl; and most preferably hydrogen or phenyl.

Representative examples of bifunctional chain extenders include maleic anhydride, nadic anhydride, vinyl phthalic anhydride, 1,2-dimethylmaleic anhydride (which compounds have an anhydride group reactive with the amine and an unsaturation for chain extension); 3-(3-phenylethynlphenoxy) aniline, phenylethynl-aniline, ethynylaniline, propargyl amine (which compounds have an amino group reactive with the anhydride and an ethylenic or acetylenic unsaturation for chain extension); and benzocyclobutene or other aromatic cyclobutene functionalized with an amine or anhydride reactive group such as 4-aminobenzocyclobutene (which compounds have an anhydride reactive amine group and cyclobutene ring, a strained aromatic ring). Preferred bifunctional chain extenders include maleic anhydride, 4-aminobenzocyclobutene, nadic anhydride, propargyl amine, and phenylethynlaniline.

The polyimide precursor product will vary depending on the type and amount of each of the aromatic dianhydride, diaminobenzoxazole and bifunctional chain extender reactants employed, and the type and amount of reactants are chosen accordingly. More specifically, the amount of the bifunctional chain extender is generally selected to prepare a polyimide precursor of desired molecular weight and solution viscosity. In general, as the amount of the bifunctional chain extender employed increases, the molecular weight of the resulting product is reduced and, hence, its solution viscosity is also reduced at the same solids level. In general, the desired solution viscosity will vary depending on a variety of factors including the desired end use. For example, when a solution of the polyimide precursor is to used in spin-coating operations, the solution will advantageously exhibit a viscosity from about 100 to about 10,000 centipoise (cps) as measured using a Brookfield viscometer, Model DV-II+, at 25° C., using Spindle no. 40 at a speed in the range of from 1 to about 10 rpm. Alternatively, in a film casting operation, the solution will advantageously exhibit a viscosity from about 500 to about 250,000 cps.

In general, the aromatic dianhydride and diaminobenzoxazole are advantageously employed in amounts from about 0.5 to about 1.5, preferably from about 0.75 to about 1.25, more preferably from about 0.8 to about 1.2, equivalents of the aromatic dianhydride per equivalent of the diaminobenzoxazole. In general, the bifunctional chain extender is added in an amount of from about 0.5 to about 0.0004, preferably from about 0.3 to about 0.02, more preferably from about 0.1 to about 0.025, equivalents of bifunctional chain extender per equivalent of the aromatic dianhydride or diamino-benzoxazole reactive with the chain extender. Most preferably, the reactants, including the diaminobenzoxazole, aromatic dianhydride, and bifunctional chain extender, are employed in amounts such that the reaction mixture contains equivalent amounts of amine and anhydride with the diaminobenzoxazole and the aromatic dianhydride both being considered to have two equivalents.

While not being bound by theory, the reaction of a diamine and dianhydride to form polyamic acid precursor can be represented by using an aminobenzocyclobutene chain extender:

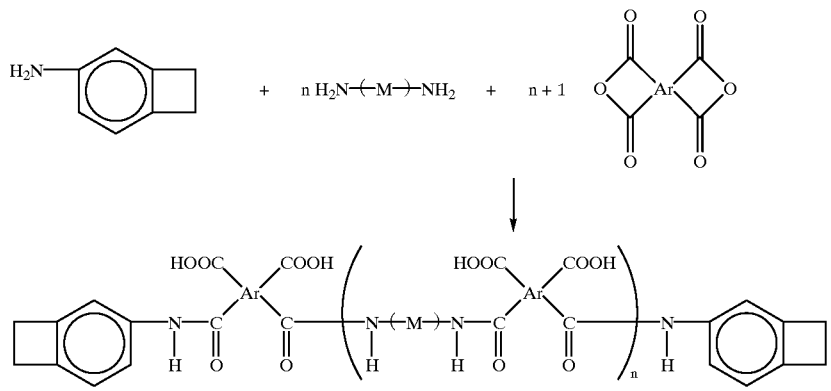

wherein M is an aromatic-containing group such as depicted hereinbefore, n is an integer with an average from about 2 to about 1,000, more generally from about 10 to about 200, and it being understood that the amic acid linkages can exist as a variety of substituted isomers.

It is not particularly critical how the aromatic dianhydride, aromatic diamine and bifunctional chain extender are contacted, and in general, they are dissolved in a suitable organic liquid as a reaction medium and reacted to form a solution of the desired polyimide precursor. By the term "polyimide precursor" is meant a polyamic acid having latent reactive end groups which are capable of further reaction to form a higher molecular weight or cross-linked polymer. The organic liquid reaction medium is preferably a liquid in which the monomers and the resulting polyimide precursor are soluble and is sufficiently inert to the monomer (s) that it does not significantly and deleteriously affect preparation of the polyimide precursor. Typically, the organic liquid reaction medium comprises a polar, aprotic liquid, including mixtures of one or more polar aprotic liquids. While the polar, aprotic liquid(s) most advantageously employed as the reaction medium is dependent on the specific dianhydride, diaminobenzoxazole, and chain extender employed, as well as the desired reaction product; preferred polar, aprotic solvents are generally amide solvents such as N,N'-dimethylacetamide, N-methylpyrrolidinone, 1,3-dimethyl-5-imidazolidinone, N,N-dimethylformamide, 1,1,3,3-tetramethylurea, or N-cyclohexylpyrrolidinone.

To facilitate the formation of a solution of the monomers or the resulting polymers in the solvent, inorganic salts such as lithium chloride and/or calcium chloride, can be added to the reaction mixture. However, this practice is not normally preferred. In addition, the organic liquid reaction medium can also comprise some amounts of a non-reactive, non-solvent for the polyamic acid precursor (e.g. toluene, tetrahydrofuran, 1,4-dioxane and the like) miscible with the non-reactive polar aprotic liquid and may be used in combination with the polar aprotic liquid. In general, the non-solvent liquid can be employed in amounts of up to about 0.75, preferably up to about 0.65, volume fraction; said volume fraction being based on the total volume of the polar aprotic liquid and miscible non-solvent.

In one method for preparing the polyimide precursor, the aromatic dianhydride, aromatic diamine, and bifunctional chain extender can be added separately, either neat or in solution, to a liquid in which the dianhydride, diamine, and chain extender are sufficiently soluble and then reacted. Alternatively, the organic liquid reaction diluent can be added to a neat mixture of the monomers or the monomer and polymer; or a solution of either the aromatic dianhydride, aromatic diamine, or bifunctional chain extender can be prepared and the other reactants, either neat or dissolved in a solvent, can be added to this solution and then reacted. Preferably, the monomers and chain extender, either neat or as a solution, more preferably neat, are simultaneously added to the liquid reaction medium.

The reaction of the dianhydride, diaminobenzoxazole, chain extender, and other monomers, if any, can be conducted at any temperature between the freezing point and the boiling point of the organic liquid reaction medium, but within that constraint, is preferably conducted at a temperature from about −40° C. to about 150° C., more preferably from about −20° C. to about 100° C., and most preferably from about 0° C. to about 50° C. Due to the equilibrium between amic acid linkage, the monomers' reactive functionalities and the presence of water (generated from thermal imidization) and its hydrolysis of amic acid linkages; the polymerization, as well as subsequent storage, is most preferably conducted at a temperature below about 50° C.

The concentrations at which the monomers and chain extender are most advantageously employed in the organic liquid reaction medium are typically limited by the solubility of the monomers and the solubility and viscosity of the resulting polyimide precursor. While these amounts are dependent on a variety of factors including the specific monomers, chain extender and organic liquid employed and the resulting polymer, the monomers are preferably used in an amount such that their concentration in the organic liquid reaction medium is at least about 0.1 weight percent. In general, the monomers are employed in an amount from about 0.5 to about 75 percent based on the total weight of the monomers and the organic liquid reaction medium. In general, the monomers are preferably employed in an amount from about 1 to about 50, more preferably in an amount from about 2 to about 30 weight percent based on the total weight of the monomers and organic liquid reaction medium employed.

In preparing the polyimide precursor, it is most preferred that the monomers, organic liquid reaction medium, and reactor vessel contain as little water as possible prior to reaction. In addition, conditions of extreme cleanliness are also most preferred. Preferably, there should initially be less than 5 mole percent water based on the total moles of dianhydride, diaminobenzoxazole, chain extender and any optionally employed additional comonomers. If necessary, toluene, or other materials capable of forming an azeotrope with water, can be added to the solvent and later distilled off to remove water. The polyimide precursor is also preferably prepared and stored in both an oxygen-free and water-free atmosphere. In addition, the monomers can be recrystallized and/or sublimed prior to use to reduce impurities.

In addition to the aromatic dianhydride and aromatic diaminobenzoxazole, the polyimide precursor may optionally be prepared using one or more other monomers, for example, a non-benzoxazole containing diamine such as 1,4-phenylenediamine or 4,4'-oxydianiline or 3,4'-oxydianiline.

These optionally employed monomers may be added to the reaction mixture prior to or during the reaction of the aromatic dianhydride and diaminobenzoxazole. In general, when employed, the monomers are employed in an amount from about 0.01 to about 50, preferably from about 0.1 to about 20, more preferably in an amount from about 0.2 to about 5, mole percent based on the total moles of aromatic dianhydride and diaminobenzoxazole employed.

A compound which has either a single functional group or a compound having only one functional group may also optionally be employed in preparing the polyamic acid; in which case the-compound terminates one end of the polyamic acid chain without providing sites for chain extension.

Following preparation of the polyimide precursor, the precursor, generally without subsequent isolation, is exposed to conditions to prepare a polyimidebenzoxazole (PIBO) from the polyimide precursor which is generally accompanied by increase in molecular weight. Any method by which a PIBO can be formed from the polyimide precursor can be employed in the practice of the present invention. In general, the polyimide precursor is simply heated to a temperature sufficient to cause the closure of amic acid linkages thereby forming PIBO from the polyimide precursor. The ring-closing reaction will form water and the total amounts of water generated increases as the reaction proceeds. Although the temperatures at which the desired PIBO can be prepared will vary depending on the latent moiety and whether a chemical ring-closing agent is employed, in general, temperatures from about 100° C. to about 600° C. are advantageously employed when a chemical ring-closing agent is not employed and from about –10° C. to about 600° C. when such an agent is employed. At these temperatures, the reaction time required to convert the polyamic acid to the desired PIBO product can range from as little as about 5 minutes or less to as much as about 200 hours or more. In general, the temperatures are more advantageously in a range from about 100° C. to about 450° C., preferably from about 150° C. to about 400° C.

Selection of specific reaction temperatures and times are dependent upon a number of factors including the composition of the precursor, the organic liquid(s) used as the reaction medium, and concentration of precursor in the reaction medium and the desired PIBO product. In general, the PIBO is advantageously prepared by exposing the polyimide precursor to an initial conversion (imidization) temperature of at least about 150° C. Conversion temperatures from about 160° C. to about 280° C. are more preferred and from 185° C. to about 230° C. most preferred. In general, these conversion temperatures are maintained for at least about 5 and no more than about 90, preferably from about 10 to about 80, more preferably from about 15 to about 75, minutes.

In a preferred method of the present invention, at least a portion of the organic liquid(s) used as the reaction medium is removed from the polyimide prescursor and the precursor then subjected to the conversion temperature. Some ring-closure or chain extension may also occur during removal of the organic liquid. To remove the necessary amounts of the organic liquid from the solution of the polyimide precursor, it can be contacted with amounts of a non-solvent for the polyamic acid such as water, methanol, acetone or other liquid and at conditions to coagulate the polyimide precursor; heated to a temperature to volatilize the solvent; or a combination of both.

In general, sufficient amounts of the organic liquid are removed from the polyimide precursor solution such that less than about 60 percent remains based on the weight of the organic liquid and the polyimide precursor. Preferably, sufficient amounts of organic liquid are removed such that there is less than about 45, more preferably less than about 35, percent organic liquid remaining based on the weight of the organic liquid and polyimide precursor. The polyimide precursor typically binds some organic liquid until imidization; thereby making it difficult to reduce the solvent level by volatilization to below about 10 weight percent.

In general, the organic liquid is vaporized at a temperature from about 50° C. to about 130° C., with the vaporization temperature(s) most advantageously employed within this range being dependent on a number of factors, particularly the vapor pressure/boiling point of the specific organic liquid(s) employed as the reaction medium. For example, a temperature of at least 50° C. is preferred when the organic liquid reaction medium comprises N,N'-dimethylacetamide and a temperature of at least about 80° C. is preferred when the organic liquid reaction medium comprises N-methylpyrrolidinone. The time to which the precursor solution is heated at the vaporization temperature is dependent on a variety of factors including the organic liquid reaction medium, percent solids, solution viscosity, exhaust rate, and the presence or absence of a coagulating fluid and chemical ring-closing agents, but, in general, a minimum of about 5 minutes is required with a maximum normally being less than about two hours. In many applications, the precursor solution is kept at the vaporization temperature until it resembles more of a solid, shaped article than a polymer solution.

The polyamic acid is then heated to the conversion temperature. In general, the temperature is increased from the vaporization temperature to the conversion temperature as quickly as possible. Preferably, the transition from an environment at the vaporization temperature to an environment at the conversion temperature should take less than about 30, preferably no more than about 10, and most preferably no more than about 5 minutes.

In the practice of the present invention, following exposure to the conversion temperature, to further improve PIBO properties, the reaction product is preferably further treated by exposure to a temperature from about 250° C., preferably from about 300° C., to a temperature which is less than about 600° C. and less than the glass-transition temperature of the resulting PIBO, for at least about 10 seconds. Preferably, the product is maintained at this elevated temperature for a sufficient time to insure sufficient conversion of the amic acid and/or isoimide linkages into imide linkages to obtain the desired PIBO properties. This further heat-treatment can unexpectedly increase certain film properties such as tensile strength and/or elongation-to-break. In one method, the PA/PIBO product is exposed to sequentially increasing heat-treating temperatures below the glass transition temperature. In a most preferred embodiment, following exposure to the conversion temperature, the PA/PIBO is exposed to (i) a single temperature of greater than about 350° C. and less than about 600° C. for between 0.1 to 120 minutes or, alternatively, to (ii) an annealing temperature from about 250° C. to about 400° C. for from about 0.1 to about 120 minutes and then optionally to a heat-treating temperature, higher than the annealing temperature, from about 260° C. to about 600° C. for from about 0.1 to about 120 minutes. The reaction(s) to prepare the PIBO from the precursor are preferably conducted in an atmosphere of air or an inert gas that is preferably moisture free.

In preparing PIBO articles, if the PIBO product is not soluble in the organic liquid(s) employed as the reaction medium, the precursor solution is formed into the desired shape of the finished product such as a film, fiber or other article using conventional techniques such as extrusion before substantial conversion of the polyamic acid to PIBO, i.e., either before or during the removal of organic liquid used as the reaction medium. If the PIBO product is soluble in the organic liquid(s) employed as the reaction medium, it is not normally necessary and may not be desirable to preshape the precursor solution. While the precursor can be removed from solution and redissolved in another solvent, the polyamic acid is preferably processed directly from the organic liquid reaction solution (diluted, if necessary, with additional amounts of the same or compatible solvent).

Shaping the precursor solution to form a film can be done by coating, casting, dipping, or spraying the precursor solution onto an appropriate substrate and imidizing the polyamic acid either partially or completely. The film may be removed either before or after the imidization reaction. Films as thin as 1 micrometer, preferably having a thickness from about 1 to about 2000, micrometers, can be made. Appropriate substrates include materials such as glass, aluminum, stainless steel, silicon, copper, polyimide film and even tetrafluoroethylene fluorocarbon polymers (marketed under the tradename Teflon™) to form a supported film. Often, a release agent such as Fluoroglide™ or IMS Silicone Spray No. S316 are used to facilitate removal of the film from the substrate.

Alternatively, the PIBO can permanently coat these or other substrates, either as a single layer coating or as a coating applied in multiple layers. The precursor solution can be applied at essentially any coating thickness and relatively thick coatings of up to 2000 micrometers can be prepared. While the desired thickness of the PIBO coating depends on the end use application, it will generally vary from about 0.1 to about 100 micrometers. The coated substrates can be prepared using a variety of techniques well-known in the art for coating liquid solutions on a substrate and include spraying, or spin- or dip-coating the precursor solution onto a clean substrate. To improve the adhesion of the PIBO to the substrate, an adhesion promoter such as 3-aminopropyltriethoxysilane can optionally be employed.

The thickness at which the precursor solution is applied as coating has a dependence on the viscosity of the solution. In general, for any given precursor, the coating thickness is reduced as the viscosity of the solution is reduced. The viscosity most preferably employed will depend on a variety of factors including the desired thickness of the coating and the coating techniques. For example, using spin-coating techniques to prepare coatings of less than 100 micrometer, the viscosity of the polyamic acid solution (as measured by a Brookfield viscometer at 25° C.) is preferably less than about 15,000 centipoise (cps), more preferably less than about 10,000 cps. Viscosity reduction can be achieved by simply diluting the polyamic acid solution to a desired viscosity.

One method for preparing multiple layered PIBO coatings involves applying a precursor solution, volatilizing the organic liquid(s) used as the reaction medium, applying another layer of precursor solution and volatilizing the organic liquid(s) used as the reaction medium, and repeating this process until such time as the desired thickness is obtained. The polyamic acid is then converted to PIBO. Alternatively, a multilayer coating can be prepared using a step-wise technique of repeated application and imidization of individual polyamic acid layers until the desired level of coating thickness has been applied. An optional adhesion promoter can be applied between layers. These types of thin PIBO coatings are useful for electrical insulating purposes and environmental resistance.

While the reaction of the polyamic acid to form PIBO is effectively conducted by merely heating the polyamic acid, imidization can be conducted in the presence of a material or combination of materials which facilitate or accelerate ring-closing (e.g., converts the amic acid linkages into imide linkages by catalyzing ring-closure via dehydration). Of these materials, those whose by-products can be removed after or during imidization by vaporization and/or washing are most preferred. Materials which can be employed include dehydration agents such as acetic anhydride and other materials listed in columns 5 and 6 of U.S. Pat. No. 3,410,826, which is incorporated herein by reference; with the preferred materials being acetic anhydride, propionic anhydride, ketene, and isobutyric dianhydride. While these materials can be employed alone, they are most preferably employed with an organic base, preferably those which do not form inorganic salts, which facilitate ring-closing activity such as picoline, pyridine, isoquinoline, triethylamine, lutidine or their mixtures, and other materials listed in column 6 of U.S. Pat. No. 3,410,826. These ring-closing agents (i.e., the dehydrating agent and organic base) are generally mixed together before use although they can be added separately to the precursor solution.

While the amount of ring-closing agent most advantageously employed is dependent on a variety of factors including the specific ring-closing agent(s) employed; the desired reaction times and temperatures and the PIBO being prepared, the dehydration agent is preferably employed in an amount of more than about 10, more preferably more than about 100, and most preferably at least about 200, mole percent, preferably being used in an amount of less than about 500, more preferably less than about 400, mole percent, said mole percent being based on the moles of dehydration agent per mole of amic acid linkage. The organic base is employed in an amount of about 1 to about 200, preferably from about 10 to about 150, more preferably from about 20 to about 100, mole percent based on the theoretical maximum number of moles of amic acid linkages. The theoretical maximum number of polyamic acid linkages is easily determined by the moles of dianhydride employed.

These ring-closing agents may by added to the precursor solution before or during removal of the organic liquid(s) used as the reaction medium or subsequent reaction. The temperature at which the precursor solution and ring-closing agents are mixed is advantageously from about −20° C. up to about 140° C., more preferably from about −20° C. to about 50° C., most preferably from about −20° C. to about 15° C. to minimize gelation or rapid buildup of viscosity of the polyamic acid solution. While the ring-closing agents, if any, can be added neat to the polyamic acid solution they are preferably added as a solution, preferably in a solution of from about 5 to about 50, weight percent, in an organic liquid which is compatible with the polyamic acid solution. Preferably, the solution of the ring-closing agents is prepared using the same solvent as employed in the polyamic acid solution.

The precursor solution can first be formed into a desired shape and the shaped article contacted with a solution of the ring-closing agents, generally for a time of at least about 30 seconds, but less than about 30 minutes. In general, once the precursor solution has been contacted with ring-closing agent, conversion of amic acid linkages to imide linkages begins, with the rate of conversion being temperature dependent.

In preparing PIBO articles, additives such as fillers, pigments, carbon black, conductive metal particles, abrasives and lubricating polymers are often advantageously employed. Conventional additives can be employed and the method of incorporating the additives is not critical. They can conveniently be added to the precursor solution prior to preparing the shaped article. The precursor solution, alone or containing additives, may be applied by any of the usual techniques (doctoring, rolling, dipping, brushing, or spraying) onto a number of different substrates. If the PIBO polymer is prepared in solid form, the additives can be added to the solution prior to processing into a shaped article.

For PIBO which remains soluble in the organic liquid reaction medium, it is generally preferred to add the ring-closing agents directly to the precursor solution, allow the reaction to proceed at slightly elevated temperatures, e.g., up to 50° C., but most preferably room temperature (about 20° C. to about 25° C.), followed by volatilization of the solvent and heat-treatment. In general, when the resulting PIBO is soluble, ring-closing agents are preferably employed.

The following examples are presented to illustrate the invention and should not be construed to limit its scope. In the examples, all parts and percentages are by weight unless otherwise indicated.

The molecular weight of the polyimide precursor can be expressed, albeit indirectly, in terms of its inherent viscosity. Inherent viscosity ("IV") is expressed as:

$$\eta_{inh} = ln\ (\eta_{rel})/c$$

wherein $\eta_{rel}$ is the relative viscosity or $t/t_o$ where t is the flow time for the polyimide precursor solution and $t_o$ is the flow time for the pure solvent, and c is concentration of polyimide precursor in solution, given in grams per deciliter. The units for IV are deciliters per gram ("dL/g"). An increase in molecular weight is generally accompanied by an increase in solution viscosity.

In these examples, inherent viscosities are measured by transferring an aliquot of the solution to a 25.0 mL volumetric flask and diluting with N-methyl-pyrrolidinone to achieve a solution concentration of about 0.2 g/dL. Solvent and solution flow times are measured at 25.0° C. using a Schott-Gerate CT 1450/AVS 310 viscometer in a Ubbelohde viscometer tube with an inner diameter of approximately 0.63 mm.

Tensile properties are measured according to ASTM D882. Adhesion is measured using a Cross-Hatch Tape Peel Adhesion Test. In such test, a coated wafer is scored using a surgical blade in a manner which produces 100 squares approximately 1 millimeter by 1 millimeter (mm). The coating is then attempted to be removed from the wafer using Scotch 810 tape and Scotch 600 tape. Four peels, two with each type tape are conducted. The results are scored as number of squares pulled off by the tape per 100 squares. The lower the number, the better the adhesion of the film. The test is then repeated after the wafers are immersed in a 95° C. water bath for one hour and cooled to room temperature.

EXAMPLE 1

Into a 3-neck, 500-mL round-bottom flask equipped with agitation means and a Dean-Stark trap with a condenser is fed 230 milliliters (mL) of N,N'-dimethylacetamide (DMAC) and 100 mL of toluene. The flask is gently purged with nitrogen and the toluene then distilled off. Into the stirred, room temperature, solvent in the flask is added 20 mL dry DMAC; 17.729 gram (g) of 2,6-(4,4'-diaminophenyl)benzo[1,2-d:5,4-d']bisoxazole (51.446 mmol) containing 0.70 weight percent of N-methylpyrrolidinone (NMP); 15.695 g of 4,4'-oxydiphthalic anhydride (50.593 mmol), and 0.167 g of maleic anhydride (1.7 mmol). After about 68 hours, the resulting polyimide precursor has an inherent viscosity (IV), measured in NMP, at 25.0° C., and 0.2 g/dL, of 1.40 dL/g.

The resulting 12.5 percent solution of polyimide precursor end-capped with maleic anhydride is spin-cast onto a clean 6" bare silicon wafer at a spread cycle of 38 seconds and 500 revolutions per minute (rpm) and a spin-cycle of 30 seconds at 6000 rpm. The coated wafer is then heated in a nitrogen atmosphere maintained at 27 minutes at 30° C., heated for 15 minutes to 60° C., maintained at 60° C. for 15 minutes, heated for 30 minutes to 225° C. and maintained at 225° C. for 15 minutes, and then heated to 300° C. for 20 minutes and maintained at 300° C. for 1 hour. The wafer is then cooled to room temperature. The film is scored with a razor blade and removed from the wafer. The film thickness is measured to be 2.7 microns ($\mu$m). The procedure is repeated and the film thickness is measured to be 2.9 $\mu$m. The procedure is repeated twice more except that the spin cycle in the spin-coating operation is 30 seconds at 7000 rpm. The film thickness of the two samples prepared in this manner is 2.6 $\mu$m and 2.5 $\mu$m, respectively. The film exhibits a tensile strength of 37.3 Ksi, a tensile modulus of 1.28 Msi, and an elongation of 16.2 percent.

An oxidized 4" silicon wafer with aluminum structures is prepared with the height of the aluminum structures on the wafer approximately 1.8 microns, with a width varying between 18 microns and 1000 microns. Before spin-casting of the precursor solution, the thus prepared wafer is Plasma-cleaned with oxygen for 15 minutes, and is dump-rinsed with water 3 times. The wafer is then spin-dried in air. An adhesion promoter of 3-aminopropyltriethyoxy silane is then spin-coated on the wafer. The precursor solution is then spin-coated on the wafer using a spread cycle of 500 rpm for 3 seconds and a spin-cycle of 1500 rpm for 30 seconds.

The polyimide precursor is then cured into a PIBO film by heating the coated wafer in a nitrogen atmosphere maintained at 27 minutes at 30° C., heated for 15 minutes to 60° C., maintained at 60° C. for 15 minutes, heated for 30 minutes to 225° C. and maintained at 225° C. for 15 minutes, and then heated to 300° C. for 20 minutes and maintained at 300° C. for 1 hour. The wafer is then cooled to room temperature. The film thickness is measured to be 9.23 μm.

The profile of the aluminum structures and the degree of planarization or planarization ratio of the PIBO on the wafer is measured by using a profilometer. The results are summarized in the following table.

| Al Width Bottom/top (μm) | Al Step Height (μm) | Film Step Height (μm) | Planarization Ratio |
| --- | --- | --- | --- |
| 18/2 | 0.910 | 0.320 | 0.648 |
| 18/2 | 1.010 | 0.48 | 0.525 |
| 24/2 | 1.705 | 0.89 | 0.478 |
| 46/20 | 1.825 | 1.475 | 0.192 |
| 114/90 | 1.825 | 1.585 | 0.132 |
| 330/304 | 1.820 | 1.625 | 0.107 |
| 1010/990 | 1.815 | 1.695 | 0.066 |

EXAMPLE 2

Using the techniques of Example 1, a polyimide precursor is prepared using an initial mixture of 59.9 mL of N-methylpyrrolidinone (NMP) and 25 mL of toluene (the toluene being distilled off) and a monomer charge of 9.185 g of 5-amino-2-(p-aminophenyl)-benzoxazole (p-DAMBO, 40.78 mmol), 0.286 g of maleic anhydride (2.91 mmol), and 8.577 g of pyromellitic dianhydride (PMDA, 39.32 mmol). The residual monomers are rinsed down using 10 mL of dry NMP. After 44 hours, the resulting polyamic acid precursor has an inherent viscosity (IV) measured in NMP, at 25.0° C., and 0.2 g/dL, of 1.19 dL/g.

The flask is chilled with ice for 10 minutes, then degassed using an aspirator vacuum for 45 minutes while chilled. The flask is brought back to atmospheric pressure using nitrogen and a mixture of 12.2 mL of NMP, 8.13 mL of acetic anhydride (AA, 86.2 mmol), and 2.16 mL of 3-picoline (3-P, 22.2 mmol) are added dropwise to the stirred, chilled polyamic acid solution over 3 minutes. The solution is stirred for 5 minutes, then degassed using an aspirator vacuum for 17 minutes. The flask is brought back to atmospheric pressure with nitrogen.

The resulting solution (about 17.5 weight percent solution of p-DAMBO and PMDA polyamic acid capped with MA in NMP) is cast onto a clean glass plate with a doctor blade with a 0.015" gap. The film is heated in an air-circulating oven at 100° C. for 40 minutes. The film is removed from the glass and secured in an aluminum frame. The film is then heated in a nitrogen atmosphere maintained at 27 minutes at 30° C., heated for 30 minutes to 225° C., maintained at 225° C. for 30 minutes, heated for 20 minutes to 300° C. and maintained at 300° C. for 120 minutes, and then cooled to ambient temperature.

The film sample exhibits a tensile strength of 35.25 Ksi, a tensile modulus of 1.41 Msi, and an elongation of 4.5 percent.

EXAMPLE 3

A polyimide precursor is prepared using the same techniques as used in Example 2, except that the initial monomer feed consists of 9.180 g of p-DAMBO (40.76 mmol), 0.307 g of MA (3.14 mmol), and 8.548 g of PMDA (39.19 mmol); the resulting precursor solution is diluted with 8.4 mL of NMP; and is reacted with a mixture 20.0 mL of NMP, 8.11 mL of AA (86.0 mmol) and 2.15 mL of 3-P (22.1 mmol) prior to being cast as a film and cured. The polyimide precursor has an inherent viscosity (IV), measured in NMP, at 25.0° C., and 0.2 g/dL, of 1.29 dL/g.

The cured film exhibits a tensile strength of 36.60 Ksi, a tensile modulus of 1.42 Msi, and an elongation of 5.6 percent.

EXAMPLE 4

Using the techniques of Example 1, a polyimide precursor is prepared from 17.420 g of p-DAMBO (77.336 mmol), 2.304 g of aminobenzocyclobutene (19.33 mmol); and 18.977 g of PMDA (87.003 mmol) in a solvent liquid reaction diluent of 149.9 mL of dry NMP (no toluene is employed and there is no distillation step). After 44 hours reaction time, the bulk solution viscosity is 3705 centipoise at 25.0° C. at 5.0 rpm on a Brookfield Model DV-ll+ viscometer using spindle cp40. At this time, the resulting polyimide precursor has an inherent viscosity (IV) measured in NMP, at 25.0° C., and 0.2 g/dL of 0.56 dL/g.

An oxidized 4" silicon wafer with aluminum structures is prepared by a standard procedure. The height of the aluminum structures on the wafer are about 1.9 microns, and their width varies between 3.3 microns and 1000 microns. The wafer is Plasma-cleaned with oxygen for 15 minutes, dump-rinsed with water 3 times, and then spin-dried in air. An adhesion promoter is then spin-coated onto the wafer. The precursor solution is then spin-coated on the wafer using a spread cycle of 500 rpm for 10 seconds and a spin cycle of 3900 rpm for 30 seconds in a spin-caster. The coated wafer is exposed to the same heating schedule as Example 1 except that the initial temperature is 80° C. rather than 60° C.

The thickness of the PIBO film on the wafer is 3.8 microns. The profile of the aluminum structures and the degree of planarization, or planarization ratio of the PIBO on the structures, are measured using a profilometer. The results are summarized in the following table.

| Al Width (μm) | Al Step Height (μm) | Film Step Height (μm) | Planarization Ratio |
| --- | --- | --- | --- |
| 4 | 1.850 | 0.915 | 0.505 |
| 11 | 1.870 | 1.270 | 0.321 |
| 32 | 1.875 | 1.390 | 0.259 |
| 100 | 1.875 | 1.505 | 0.197 |
| 320 | 1.875 | 1.740 | 0.072 |
| 1000 | 1.860 | 1.805 | 0.030 |

EXAMPLE 5

Using the same techniques as Example 4, a polyimide precursor solution is prepared from 19.400 g of p-DAMBO (86.127 mmol), 3.378 g of MA, (34.45 mmol), 15.029 g of PMDA (68.901 mmol), in 104.2 mL of dry NMP. The resulting precursor has an inherent viscosity (IV) measured in NMP, at 25.0° C., and 0.2 g/dL, of 0.309 dL/g.

Using the same techniques as Example 4, the precursor is used to coat an oxidized 4" silicon wafer (with the height of the aluminum structures being about 1.9 microns, and the width varying between 3.3 microns and 1000 microns) using a spread cycle of 500 rpm for 15 seconds and a spin cycle of 4600 rpm for 30 seconds in a spin-caster. The coated wafer is then heated in a nitrogen atmosphere maintained at 27 minutes at 30° C., heated for 15 minutes to 80° C., maintained at 80° C. for 15 minutes, heated for 30 minutes to 225° C. and maintained at 225° C. for 15 minutes, and then heated to 300° C. for 20 minutes and maintained at 300° C. for 1 hour. The wafer is then cooled to room temperature.

The thickness of resulting PIBO coating on the wafer is 4.175 microns. The profile of the aluminum structures and the degree of planarization, or planarization ratio, of the PIBO on the structures are measured by using a profilometer. The results are summarized in the following table. Small amounts of particulates are observed in the coating.

| Al Width Bottom/top (μm) | Al Step Ht. Height (μm) | Film Step Height (μm) | Planarization Ratio |
|---|---|---|---|
| 26/2 | 1.670 | 0.815 | 0.555 |
| 30/6 | 1.930 | 1.260 | 0.356 |
| 54/22 | 1.985 | 1.525 | 0.225 |
| 120/92 | 1.995 | 1.720 | 0.132 |
| 335/310 | 2.005 | 2.010 | −0.008 |
| 1030/1000 | 2.010 | 2.030 | −0.014 |

EXAMPLE 6

Using the method of Example 1, a polyimide precursor is made from 2.320 g of p-DAMBO (10.30 mmol), 0.040 g of MA (0.40 mmol), and 2.203 g of PMDA (10.10 mmol) in 25.0 mL of N-methyl pyrrolidinone (dried with 10 mL of toluene which has been distilled off) exhibits an inherent viscosity (IV) measured in NMP, at 25.0° C., and 0.2 g/dL, of 1.80 dL/g. Its bulk solution viscosity is 125,950 centipoise measured on a Brookfield Model DV-ll+ Viscometer at 25.0° C. at 1.0 rpm with spindle cp51. After being cast onto a clean glass plate with a doctor blade with a 0.030" gap, the film is heated in an air-circulating oven at 100° C. for 60 minutes and removed from the oven. The oven is warmed to 225° C. and the supported film is placed in the oven for about 10 minutes with film pulling from the glass and breaking. The brittle film has a thickness of about 2 mils which for this specific polymer and these processing conditions were too thick for practical use.

EXAMPLE 7

Using the techniques of Example 2, a polyimide precursor is prepared from 13.853 g of p-DAMBO (61.500 mmol), 0.119 g of MA (1.22 mmol), and 13.282 g of PMDA (60.892 mmol) in 149.5 mL NMP (dried with 20 mL of toluene which has been distilled off). The resulting precursor has an inherent viscosity (IV) measured in NMP, at 25.0° C., and 0.2 g/dL, of 1.80 dL/g. The bulk solution viscosity is 105,900 centipoise measured on a Brookfield Model DV-II+ Viscometer at 25.0° C. at 1.0 rpm with spindle cp51.

Using techniques of Example 2, the resulting precursor solution is reacted with 12.2 mL of acetic anhydride (0.129 mol) and 3.2 mL of 3-picoline (33 mmol) which are added dropwise as a solution in 35.2 mL of NMP.

The solution is cast onto a clean glass plate with a doctor blade with a 0.040" gap and heated in an air-circulating oven at 80° C. for 90 minutes and 100° C. for 30 minutes with a 90° rotation every 30 minutes. The film is removed from the oven and framed. The oven is warmed to 225° C. and the film placed in the oven for about 50 minutes. The oven temperature is then raised to 300° C. over 20 minutes and held at 300° C. for 2 hours. The framed film is then heated, in a nitrogen atmosphere to 400° C. for 30 minutes and maintained at 400° C. for 2 hours. The film is then cooled to room temperature. The film has a thickness of 49.8 μm. The film exhibits tensile strength of about 55.65 Ksi, a tensile modulus of about 1.28 Msi, and an elongation of about 19.2%.

EXAMPLE 8

A 3-neck, 250 mL round-bottom flask equipped with agitation means is fed with 20.423 g of 5-amino-2-(m-aminophenyl)benzoxazole (90.669 mmol), 2.540 g of maleic anhydride (25.91 mmol), 16.952 g of pyromellitic dianhydride (77.716 mmol), and 90.0 mL of dry NMP. The flask is gently purged with nitrogen. The mixture is further diluted with 9.4 mL of dry NMP. After 44 hours, the resulting polyamic acid precursor has an inherent viscosity (IV) measured in NMP, at 25.0° C., and 0.2 g/dL, of 0.340 dL/g. The solution is further diluted by adding 7.7 mL of dry NMP. The viscosity of the resulting solution is measured to be 5876 centipoise on a Brookfield Model DV-II+ viscometer at 25.0° C., spindle cp40, at 2.5 rpm.

An oxidized 4" silicon wafer with aluminum structures having a height of approximately 1.9 microns, and widths which vary between 3.3 microns and 1000 microns is plasma-cleaned with oxygen for 15 minutes and dump-rinsed with water 3 times. The wafer is then spin-dried in air and then an adhesion promoter is spin-coated on the wafer. The polyamic acid solution is spin-coated on the wafer using a spread cycle of 500 rpm for 10 seconds and a spin-cycle of 5950 rpm for 30 seconds in a spin-caster. The PAA coated wafer is then converted to PIBO by heating the coated wafer in a nitrogen atmosphere maintained for 27 minutes at 30° C., heated for 15 minutes to 80° C., maintained at 80° C. for 15 minutes, heated for 30 minutes to 225° C., maintained at 225° C. for 15 minutes, heated for 20 minutes to 300° C. and maintained at 300° C. for 60 minutes, and then cooled to ambient temperature.

The thickness of resulting PIBO coating is about 4.085 microns. The profile of the aluminum structures and the degree of planarization, or planarization ratio, of the PIBO on the structures are measured using a profilometer. The results are summarized in the following table. Small amounts of particulates are observed in the coating.

| Al Width Bottom/top (μm) | Al Step Height (μm) | Film Step Height (μm) | Planarization Ratio |
|---|---|---|---|
| 13/1 | 1.525 | 0.380 | 0.793 |
| 26/2 | 1.570 | 0.700 | 0.585 |
| 32/4 | 1.865 | 1.170 | 0.373 |
| 54/22 | 1.945 | 1.485 | 0.236 |
| 125/90 | 1.950 | 1.650 | 0.149 |
| 340/305 | 1.950 | 1.960 | −0.003 |
| 1030/1000 | 1.940 | 1.925 | 0.006 |

EXAMPLE 9

Using techniques similar to those of Example 2, a polyamic acid is prepared from 46.042 g of 2,6-(4,4'-diaminodiphenyl)benzo[1,2-d:5,4-d']bisoxazole (0.13376 mol) containing 0.54 weight percent NMP, 0.434 g of maleic anhydride (4.43 mmol), and 40.807 g of 4,4'-oxydiphthalic dianhydride (0.13154 mmol) as a solution in 650 mL of DMAC and 130 mL of toluene (the toluene being distilled off prior to monomer addition). After about 68 hours, the resulting polyimide precursor has an inherent viscosity (IV), measured in NMP at 25.0° C., and 0.2 g/dL of 1.37 dL/g.

Using the techniques of Example 2, a 53.12 g portion of this solution is reacted with 2.01 mL of acetic anhydride and 0.53 mL of 3-picoline (added as a solution in 4.9 mL of DMAC).

The resulting solution is cast onto a clean glass plate with a doctor blade with a 0.010" gap. The film is heated in an air-circulating oven at 60° C. for 30 minutes and then removed from the glass and secured in an aluminum frame. It is then heated, in the air-circulating oven, to 225° C.,

EXAMPLE 10

Using the techniques of Example 2, a polyimide precursor is prepared from 9.866 g of p-DAMBO (43.80 mmol), 0.094 g of MA (0.094 mmol), and 9.449 g of PMDA (43.32 mmol) in 100 mL of N,N'-dimethylacetamide (DMAC) and 20 mL of toluene (the toluene being distilled off prior to addition of the monomers and the residual monomers being rinsed with 17.4 mL of dry DMAC. After 44 hours, the resulting polyamic acid precursor has an inherent viscosity (IV) measured in NMP, at 25.0° C. and 0.2 g/dL, of 2.34 dL/g.

The resulting polyimide precursor is reacted with 8.66 mL of acetic anhydride (91.8 mmol), and 2.28 mL of 3-picoline (23.4 mmol) (added to an ice-chilled solution as a solution in 21.0 mL of DMAC). The solution is stirred for 4.0 minutes with subsequent degassing by aspirator vacuum for 15.0 minutes. The flask is brought back to atmospheric pressure with nitrogen and the solution cast onto a clean glass plate with a doctor blade (12" width) with a 0.040" gap. The film is heated in an air-circulating oven at 60° C. for 2 hours. The film is removed from the glass and secured in an aluminum frame. The framed film is heated in an air-circulating oven heated at 225° C. for 50 minutes, then heated for 20 minutes to 300° C., maintained for 2 hours at 300° C. and then cooled to room temperature. The film is then heat-treated in a nitrogen atmosphere at 400° C. for 2 hours.

The film exhibits a tensile strength of 45.2 Ksi, a tensile modulus of 1.36 Msi, and an elongation of 12.6%.

EXAMPLE 11

Using the techniques of Example 2, a polyimide precursor is prepared from 142.000 g of p-DAMBO (0.63041 mol), 1.359 g of MA (0.01386 mol), and 135.993 g of PMDA (0.62348 mol) dissolved in 1983 mL of NMP and 100 mL of toluene (the toluene being distilled off prior to monomer addition). After 68 hours, the resulting polyimide precursor has an inherent viscosity (IV) measured in NMP, at 25.0° C., and 0.2 g/dL, of 2.39 dL/g and a bulk solution viscosity of 117,800 centipoise as measured on a Brookfield Model DV-II+ Viscometer at 1.0 rpm with spindle cp51.

The resulting solution is cast onto a clean glass plate with a 15" doctor blade with a 0.040" gap. The film is heated in an air-circulating oven at 100° C. for 90 minutes. The film is removed from the glass and secured in an aluminum frame. The framed film is heated in an air-circulating oven for 30 minutes at 120° C., 10 minutes at 225° C., 10 minutes at 400° C. and then cooled to room temperature. The resulting film has a tensile strength of 42.9 Ksi, a tensile modulus of 1.51 Msi, and an elongation of 7.6%.

COMPARATIVE EXAMPLE A

A polyimide precursor is prepared from 3.400 g of p-DAMBO (15.09 mmol), 0.407 g of phthalic anhydride (2.74 mmol of a monofunctional end-capping agent), and 6.096 g of 2,2-bis(3,4-dicarboxyphenyl)hexafluoropropane dianhydride (13.72 mmol) with residual monomers rinsed down by 2.4 mL of dry N-methylpyrrolidinone (NMP) in 20 mL NMP and 10 mL of toluene (the toluene having been distilled off and the flask being purged with nitrogen prior to monomer addition). After about 22 hours, the resulting polyimide precursor has an inherent viscosity (IV), measured in NMP, at 25.0° C., and 0.2 g/dL, of 0.39 dL/g. The resulting solution is further diluted by adding 6.2 mL of NMP.

The reaction product is reacted with 4.22 mL of acetic anhydride and 1.08 mL of 3-picoline (added as a solution in 12.8 mL of NMP). This mixture is allowed to warm to room temperature and kept at room temperature for about 72 hours. The resulting product is precipitated into deionized water, rinsed several times with fresh deionized water, collected by filtration, and dried to a constant weight of 8.38 g in a 50° C. vacuum oven. The inherent viscosity of the chemically imidized product is 0.34 dL/g when measured in NMP, at 25.0° C.; and 0.2 g/dL.

The resulting isolated solid is redissolved in 21.1 mL of NMP. This resulting solution is cast onto a clean silylated Pyrex® glass plate with a doctor blade with a 0.015" gap. The film is heated in an air-circulating oven at 100° C. for 1 hour. The film is then heated in an air-circulating oven heated to 225° C. for 20 minutes, heated for 20 minutes to 300° C., and maintained at 300° C. for 1 hour. The supported film is cooled on its supporting glass and it cracks into small pieces while cooling.

COMPARATIVE EXAMPLE B

Using the techniques of Comparative Example A, a polyimide precursor is prepared from 3.400 g of p-DAMBO (15.09 mmol), 0.279 g of phthalic anhydride (1.89 mmol of a monofunctional terminal chain-capping agent), and 6.287 g of 2,2-bis(3,4-dicarboxyphenyl)hexafluoropropane dianhydride (14.15 mmol) with residual monomers rinsed down by 2.3 mL of dry N-methylpyrrolidinone (NMP) in 20 mL of NMP and 10 mL of toluene (the toluene having been distilled off and the flask being purged with nitrogen prior to monomer addition). After about 22 hours, the resulting polyimide precursor has an inherent viscosity (IV), measured in NMP, at 25.0° C., and 0.2 g/dL, of 0.484 dL/g. The resulting solution is diluted by adding 10.1 mL of NMP.

The resulting precursor is reacted with 4.22 mL of acetic anhydride and 1.08 mL of 3-picoline (added to an ice-chilled solution in 12.8 mL of NMP) at room temperature and kept at room temperature for about 48 hours. The product is precipitated into deionized water, rinsed several times with fresh deionized water, collected by filtration, and dried to a constant weight of 8.61 g in a 50° C. vacuum oven. The inherent viscosity of the chemically imidized product is 0.438 dL/g when measured in NMP, at 25.0° C., and 0.2 g/dL.

The resulting, chemically imidized, product is dissolved with 24.8 mL of NMP and cast onto a clean silylated Pyrex® glass plate with a doctor blade with a 0.015" gap. The film is heated in an air-circulating oven at 100° C. for 1 hour. The film is then heated in an air-circulating oven heated to 225° C. for 20 minutes, heated for 20 minutes to 300° C., and maintained at 300° C. for 1 hour. The film is cooled on its supporting glass and does not crack into pieces. However, the resulting film was brittle.

EXAMPLE 12

Into a 3-neck, 2000-mL round-bottom flask equipped with agitation means and a Dean-Stark trap with a condenser is fed 417.5 mL of N-methylpyrrolidinone and 30 mL of toluene. The flask is gently purged with nitrogen and the toluene then distilled off. After cooling to room temperature, 812.5 mL of anhydrous tetrahydrofuran is added to the flask with the flask kept under positive nitrogen. Into the stirred, room temperature organic liquid reaction medium is added 73.774 g of 5-amino-2-(p-aminophenyl)benzoxazole (0.32752 mol); 70.652 g of pyromellitic dianhydride (0.32391 mol); 0.706 g of maleic anhydride (7.20 mmol); and 20.0 mL of anhydrous N-methylpyrrolidinone. After about 68 hours, the resulting polyimide precursor has an inherent viscosity (IV), measured in NMP, at 25.0° C., and 0.2 g/dL, of 2.41 dL/g.

EXAMPLE 13

Into a 3-neck, 100 mL round-bottom flask equipped with agitation means and a Dean-Stark trap with condenser is fed 22.5 mL of N-methylpyrrolidinone and 32.5 mL of toluene. The flask is gently purged with nitrogen and 10.0 mL of toluene then distilled off. After cooling to room temperature, the flask is kept under positive nitrogen. Into the stirred, room temperature organic liquid reaction medium is added 2.961 g of 5-amino-2-(p-aminophenyl)benzoxazole (13.14 mmol); 2.836 g of pyromellitic dianhydride (13.00 mmol); and 0.028 g of maleic anhydride (0.29 mmol). After about 44 hours, the resulting polyimide precursor has an inherent viscosity (IV), measured in NMP, at 25.0° C., and 0.2 g/dL, of 2.54 dL/g.

What is claimed is:

1. A polyimidebenzoxazole film comprising, in polymerized form, pyromellitic dianhydride, an aromatic diaminobenzoxazole, selected from the group consisting of 2,6-(4,4'-diaminodiphenyl)benzobisoxazole, 5-amino-2-(p-aminophenyl) benzoxazole, 5-amino-2-(m-aminophenyl) benzoxazole, 2,2'-p-phenylenebis(5-aminobenzoxazole) and mixtures thereof and a bifunctional chain extender wherein said film is a coating on a substrate.

2. The polyimidebenzoxazole film of claim 1 wherein the aromatic diaminobenzoxazole is selected from the group consisting of 5-amino-2-(p-aminophenyl)-benzoxazole, 2,6-(4,4'-diaminophenyl)benzo[1,2-d:5,4-d]-bisoxazole and mixtures thereof.

3. The polyimidebenzoxazole film of claim 2 wherein the aromatic diaminobenzoxazole is 5-amino-2-(p-aminophenyl) benzoxazole.

4. The polyimidebenzoxazole film of claim 1 wherein the bifunctional chain extender is $H_2N—M—C(R)=C(R)_2$, $H_2N—M—C≡C(R)$,

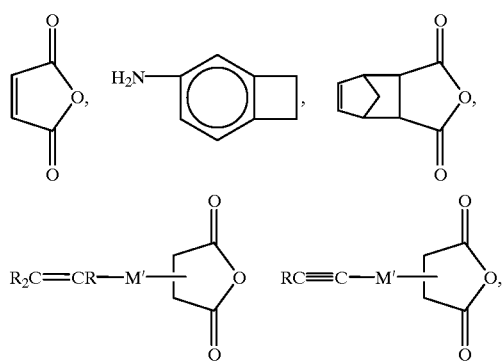

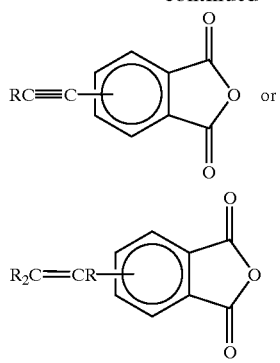

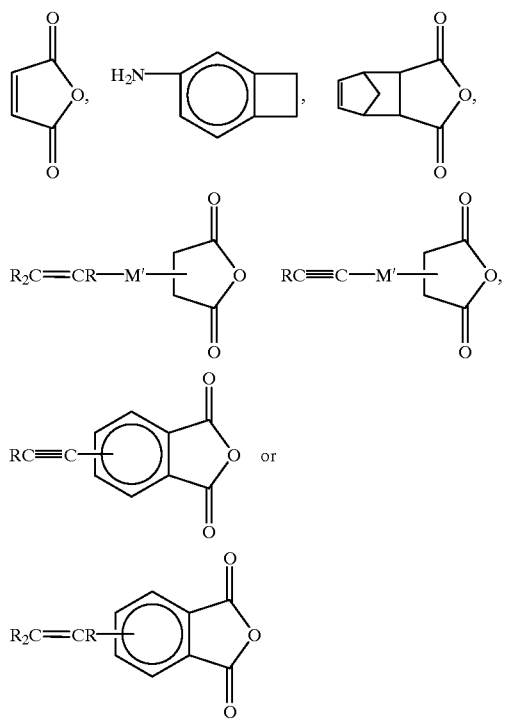

where M' is a divalent organic radical and R is hydrogen, methyl or phenyl.

5. The polyimidebenzoxazole film of claim 1 wherein the bifunctional chain extender is maleic anhydride, 4-aminobenzocyclobutene, nadic anhydride, propylamine, benzocyclobutene or phenylethynlaniline.

6. The polyimidebenzoxazole film of claim 5 wherein the bifunctional chain extender is maleic anhydride.

7. The polyimidebenzoxazole film of claim 2 wherein the bifunctional chain extender is $H_2N—M—C(R)=C(R)_2$, $H_2N—M—C≡C(R)$, where M' is a divalent organic radical and R is hydrogen, methyl or phenyl.

8. The polyimidebenzoxazole film of claim 2 wherein the bifunctional chain extender is maleic anhydride, 4-aminobenzocyclobutene, nadic anhydride, propylamine, benzocyclobutene or phenylethynlaniline.

9. The polyimidebenzoxazole film of claim 8 wherein the bifunctional chain extender is maleic anhydride.

10. The polyimidebenzoxazole film of claim 3 wherein the bifunctional chain extender is $H_2N—M—C(R)=C(R)_2$, $H_2N—M—C≡C(R)$,

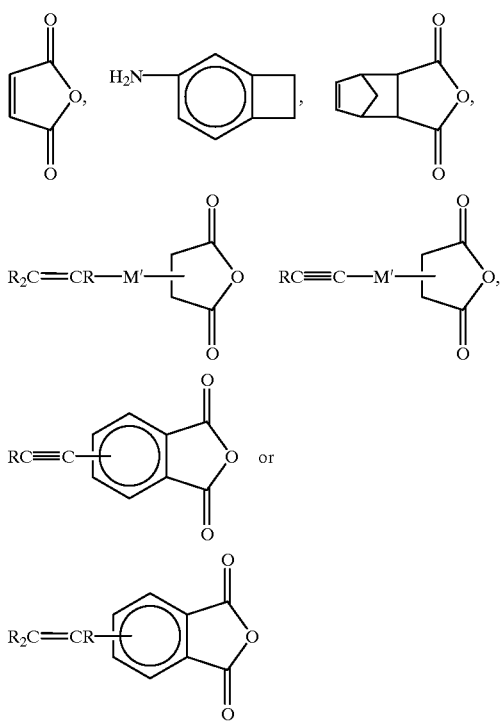

where M' is a divalent organic radical and R is hydrogen, methyl or phenyl.

11. The polyimidebenzoxazole film of claim 3 wherein the bifunctional chain extender is maleic anhydride, 4-aminobenzocyclobutene, nadic anhydride, propylamine, benzocyclobutene or phenylethynlaniline.

12. The polyimidebenzoxazole film of claim 10 wherein the bifunctional chain extender is maleic anhydride.

13. The polyimidebenzoxazole film of claim 1 wherein the substrate is glass, aluminum, stainless steel, silicon, copper or a tetrafluoroethylene fluorocarbon polymer.

14. The polyimidebenzoxazole film of claim 3 wherein the substrate is glass, aluminum, stainless steel, silicon, copper or a tetrafluoroethylene fluorocarbon polymer.

15. The polyimidebenzoxazole film of claim 4 wherein the substrate is glass, aluminum, stainless steel. silicon, copper or a tetrafluoroethylene fluorocarbon polymer.

16. The polyimidebenzoxazole film of claim 12 wherein the substrate is glass, aluminum, stainless steel, silicon, copper or a tetrafluoroethylene fluorocarbon polymer.

\* \* \* \* \*